Oct. 1, 1929.  H. J. LOUNSBURY  1,730,223
SHOCK ABSORBING MECHANISM FOR VEHICLES
Filed Dec. 3, 1925
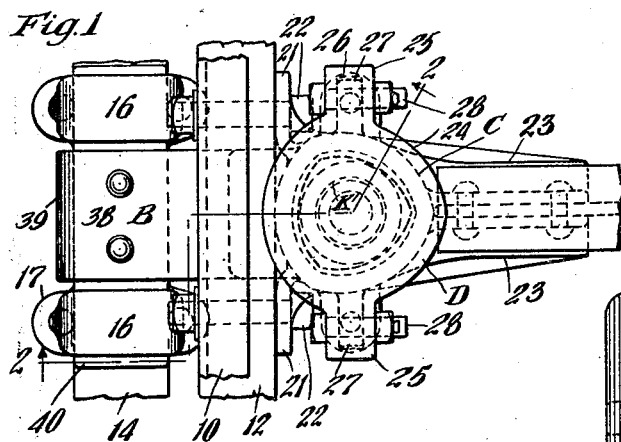
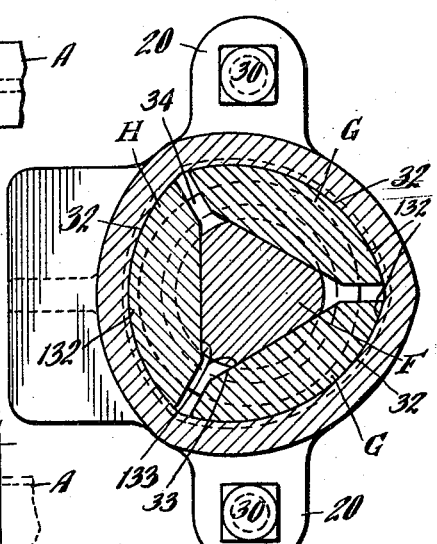
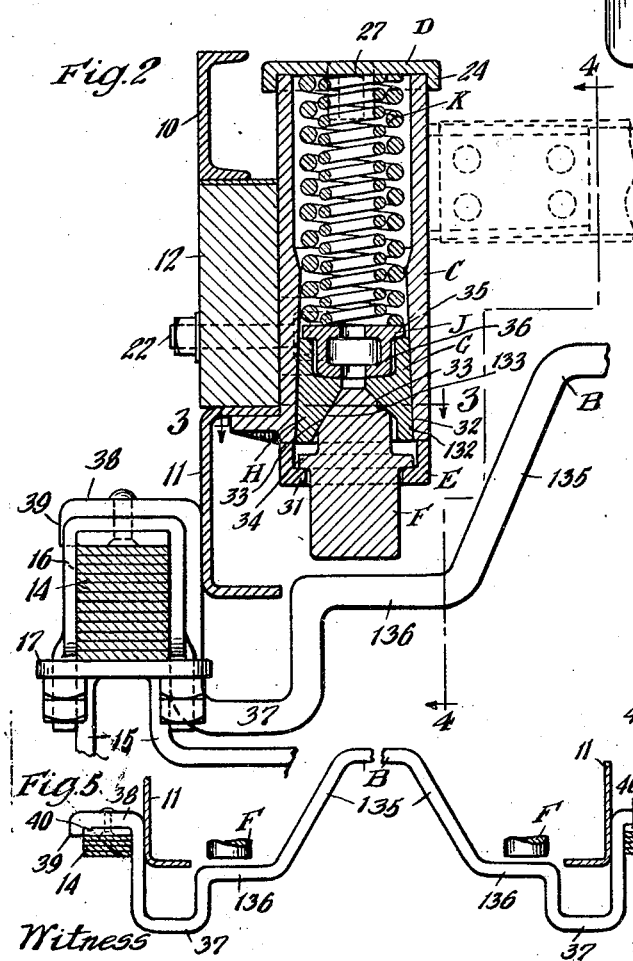
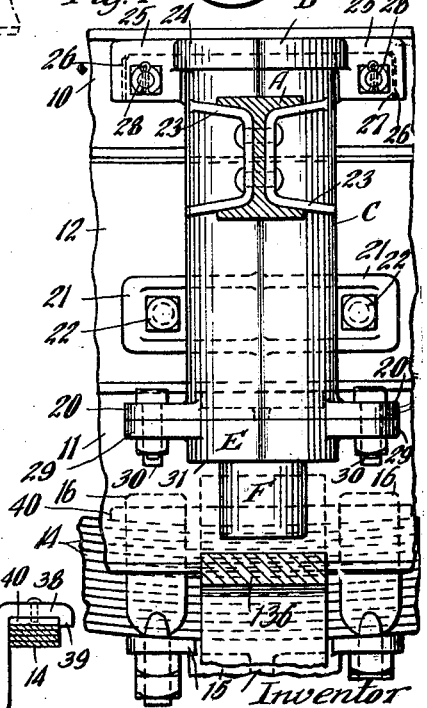
Witness
Wm. Geiger
Inventor
Harvey J. Lounsbury
By George I. Haight
His Atty.

Patented Oct. 1, 1929

1,730,223

UNITED STATES PATENT OFFICE

HARVEY J. LOUNSBURY, OF GLEN ELLYN, ILLINOIS, ASSIGNOR TO W. H. MINER, INC., OF CHICAGO, ILLINOIS, A CORPORATION OF DELAWARE

SHOCK-ABSORBING MECHANISM FOR VEHICLES

Application filed December 3, 1925. Serial No. 72,867.

This invention relates to improvements in shock absorbing mechanisms for vehicles.

One object of my invention is to provide an efficient and dependable shock absorber especially adapted for vehicles having high capacity.

A further object of the invention is to provide a shock absorbing mechanism which is adapted to be employed in connection with vehicles having the usual spring suspension, wherein high capacity is obtained by the use of friction elements cooperating with spring cushioning means acting in addition to the vehicle springs after the latter have absorbed a predetermined amount of the shock.

Another object of the invention is to provide a shock absorbing mechanism which may be attached to more vehicles of standard type having the usual springs without substantial change or alteration in the standard parts of the vehicle structure itself.

Other objects and advantages of the invention will more clearly appear from the description and claims hereinafter following.

In the drawings forming a part of this specification, Figure 1 is a horizontal, plan view of a portion of the chassis of a vehicle showing my improvements in connection therewith, at one side of the vehicle. Figure 2 is a vertical, sectional view corresponding substantially to the line 2—2 of Figure 1, the section through the friction shell and parts therewithin corresponding to two intersecting planes 120° apart. Figure 3 is a horizontal, sectional view corresponding substantially to the line 3—3 of Figure 2. Figure 4 is a vertical, sectional view longitudinally of the vehicle, corresponding substantially to the line 4—4 of Figure 2. Figure 5 is a transverse, vertical, sectional view through a portion of the chassis illustrating the manner of application of my improved shock absorbing mechanism at opposite sides of the vehicle.

In said drawings, 10, 11 and 12 designate respectively longitudinally extending channel beams, and a longitudinally extending solid beam of rectangular cross-section, the three beams together forming one of the side sills of the chassis of the vehicle. As most clearly shown in Figure 2, the rectangular beam 12 is disposed intermediate the beams 10 and 11 which are disposed respectively above and below the same and are suitably fixed thereto, the usual vehicle spring is indicated by 14, each spring comprising a plurality of superimposed leaves, a set of springs 14 being employed at each side of the vehicle. As in the drawings shown, my improved shock absorbing mechanism is illustrated as applied to the rear end of the motor vehicle adjacent and above the rear axle structure. The rear axle structure of the vehicle is indicated by 15, on which are supported the springs 14, the latter being held in assembled relation by a pair of clips 16, of U-shaped form and bracing the same and having the free arms thereof extending through plate 17 of axle 15 disposed below the springs. As most clearly shown in Figures 2 and 4, the clips 16 have the free ends of the arms thereof screw-threaded and are held to the plate 17 by suitable nuts.

My improved shock absorbing mechanism comprises broadly a pair of duplicate shock absorbing devices at opposite sides of the vehicle, united by a transverse I-beam A and cooperating with a tie strap or yoke member B. Only one of the shock absorbing devices is shown in the drawing, the same including a friction shell or cylinder C, caps or heads D and E, a wedge F, three friction shoes G, G and H, a spring follower J and a main spring resistance K.

The friction shell C is of substantially triangular, cylindrical form, open at its opposite ends and provided with a horizontal flange at the lower end thereof adapted to engage the inner surface of the upper horizontal section of the lowermost channel beam 11, of the chassis. Adjacent the lower ends thereof, the cylinder C has a pair of laterally projecting ears 20 for a purpose hereinafter described. Above the ears 20 the cylinder has a pair of laterally projecting, vertically disposed flanges 21 on the side nearest adjacent the beam 12. The flanges 21 serve as means for securing the cylinder C to the beam 12. Each of the flanges 21 is provided with an opening adapted to receive a bolt 22 extending through the beam 12 by which the cylinder is held to the beam. Adjacent the upper end, on the side opposite to the beam 12, the cylinder C is provided with a pair of laterally extending parallel spaced arms 23—23. The arms 23 are adapted to accommodate the adjacent end of the I-beam A therebetween, which is secured thereto in any suitable manner, preferably by rivets, as shown, the rivets extending through the arms 23 and the central web of the I-beam. The I-beam A serves to rigidly connect the two cylinders C at opposite sides of the vehicle, it being understood that a cylinder C similar to that shown in Figure 2 is employed at the opposite side of the vehicle, to which the I-beam A is connected in the same manner. The upper end of the cylinder is closed by a cap or head D, the cap or head being in the form of a substantially flat disk having a downwardly extending flange 24 receiving the upper end of the cylinder. At opposite sides, the head or cap D is provided with a pair of lateral enlargements 25 having upwardly extending openings 26—26 adapted to receive a pair of lugs 27 formed integral with the upper end of the shell C. In order to prevent removal of the head or cap D from the cylinder, the enlargements 25 are secured to the lugs 27 by bolts 28 extending transversely therethrough as most clearly shown in Figure 1.

At the lower end, the cylinder is also provided with a head or cap E having a pair of ears 29 at the opposite sides thereof, adapted to cooperate with the ears 20. The head E is secured to the cylinder preferably by means of bolts 30 extending through the ears 20 and 29. The head F is of substantially cylindrical form and corresponds in size to the lower end of the cylinder, and has the inner end thereof in abutment with the end of the cylinder. At the free end, the cylinder head or cap E is provided with an interior annular flange 31 for a purpose hereinafter described.

The friction shell C has three inwardly converging true cylindrical friction surfaces 32—32 with which the friction shoes G, G and H cooperate. The rear end of the shell C provides a spring cage section within which the main spring resistance K is accommodated. The spring resistance K is composed of inner and outer coils, the inner coil being preferably lighter than the outer one. The springs bear at their upper end on the inner side of the head D and at their lower end bear on the spring follower J.

The friction shoes G, G and H are of similar design except as hereinafter pointed out, each shoe has an outer true cylindrical friction surface 132 adapted to cooperate with one of the friction surfaces 32 of the shell. On the inner side, each shoe is provided with a lateral enlargement having a wedge face 33 on the outer side thereof. The wedge faces 33 of the shoes G are disposed at a relatively blunt non-wedging angle with reference to the longitudinal axis of the mechanism while the wedge face 33 of the shoe H is disposed at a relatively keen, true wedge-acting angle with reference to said axis.

The main wedge F is in the form of a substantially cylindrical block having wedge faces 133 at the inner end thereof, the wedge faces 133 being three in number and arranged symmetrically about the axis of the mechanism. Two of the wedge faces 133 are correspondingly inclined to and co-operate with the wedge faces 33 of the shoes G while the remaining wedge face 133 is correspondingly inclined to and cooperates with the wedge face 33 of the shoe H. Outwardly of the wedge faces the wedge block F is provided with an annular flange 34 adapted to cooperate with the flange 31 of the cylinder to limit outward movement of the wedge. As most clearly shown in Figures 2 and 4, the wedge block F extends an appreciable distance outwardly beyond the corresponding end of the friction shell.

The spring follower J, which is interposed between the lower ends of the two coils of the spring resistance K and the friction shoes G, G and H, is in the form of a hollow cap, having a relatively heavy annular flange 35 bearing on the inner ends of the friction shoes and an enlarged cup-shaped portion 36 bearing on the inner ends of the enlargements on the friction shoes.

As most clearly shown in Figure 5, the yoke or tie member B which extends from one side to the other of the vehicle, has the opposite ends thereof supported on the spring suspension including the springs 14, at opposite sides of the vehicle. The yoke or the strap B is in the form of a relatively heavy bar of rectangular cross-section having an arched central portion 135 adapted to clear the differential housing on the rear axle of the vehicle, a pair of horizontally disposed sections 136—136 adapted to co-operate respectively with the wedge blocks F at opposite sides of the vehicle, a pair of offset portions 37—37 adapted to clear the lower channel beams 11, and a pair of horizontal end sections 38 adapted to bear on the top of the springs 14, the extremities of the sections 38 being downturned as indicated at 39—39. A wear plate 40 is preferably interposed between each horizontal section 38 and the uppermost plate of the corresponding spring 14, the plates 40 being secured in any suitable manner to the yoke or tie strip B, preferably by rivets as shown. As most clearly shown in Figure 2, the lower end of each wedge block F is normally spaced from the corresponding section 136 of the yoke B. The proportions and arrangement of the parts is such that a predetermined clearance is left between the wedge and the corresponding horizontal section 136 of the yoke B when the vehicle is loaded to full capacity so that the shocks to which the vehicle is subjected will be initially absorbed by the vehicle springs, and extremely heavy shocks will be absorbed by both the vehicle spring and the friction shock absorbing device.

Inasmuch as the friction shock absorbing devices are relatively fixed with reference to the main body portion or chassis of the vehicle and the yoke B is directly supported on the vehicle springs 14 which in turn are fixed to the axle of the vehicle, any relative movement of the axle with reference to the body of the vehicle will be imparted to the yoke B, thereby causing the abutment sections 136 thereof to approach the wedge members F. During the relative movement described, the springs 14 will be flexed until the abutments 136 engage the lower ends of the wedge blocks F, whereupon the latter will be forced inwardly with reference to the friction shells, setting up a wedging action between the wedge and the shoes and forcing the friction shoes inwardly of the shells against the tension of the main spring resistance elements. Immediately after the shock has been absorbed, the vehicle springs, together with the main springs of the friction shock absorbing devices will restore all of the parts to normal position, the main springs K effecting restoration of the friction wedge system including the wedge friction shoes and the wedge blocks.

By providing the relatively keen co-acting true wedge faces on the wedge block and the wedge friction shoes H, a relatively high spreading action is obtained, while the co-operating blunt wedge faces of the shoes G and wedge F compensate for the relative approach of the shoes due to the taper of the shell C and also facilitate release and further act in the manner of "safety valves".

Although in the particular embodiment of the invention herein illustrated, I have shown a wedge system comprising blunt and keen angled shoes and wedge members, it will be evident that it is within the scope of my invention to provide inter-engaging wedge faces on the wedge member and shoes which are all of the same angularity.

While I have herein shown and described what I now consider the preferred manner of carrying out my invention, the same is merely illustrative and I contemplate all changes and modifications that come within the scope of the claims appended hereto.

I claim:

1. In a shock absorber for vehicles adapted to cooperate with the spring suspension structure thereof, said structure including a spring and a spring supporting member, the combination with a friction shell fixed to the vehicle structure proper; of friction shoes within the shell; abutment means; a pressure transmitting member adapted to be actuated upon engagement with the abutment means, the latter being supported by the vehicle springs, said wedge and shoes having co-operating sets of wedge faces, a set of said faces being disposed at a relatively keen wedge-acting angle with reference to the longitudinal axis of the shell; and another set of said faces being disposed at a relatively blunt releasing angle with reference to said axis; and a spring resistance within the shell opposing movement of said shoes.

2. In a vehicle, the combination with a vehicle spring and spring suspension means at opposite sides of the vehicle; of a plurality of shock absorbing devices, each including a cylinder fixed to a part of the vehicle structure proper, a plurality of friction shoes within each cylinder, spring resistance means cooperating with the shoes, and a wedge member engaging said shoes; means for ridigly connecting said cylinders of said devices, and a yoke strap cooperating with the vehicle spring suspension at the opposite sides of the vehicle, said strap having abutment means thereon normally spaced from the wedge members of the respective shock absorbing devices.

3. In a vehicle, the combination with vehicle springs and spring suspension means at opposite sides of the vehicle; of a pair of shock absorbing device, each including a cylinder fixed to a part of the vehicle structure proper, and a friction system co-operating with each cylinder, said system including a lateral pressure creating member and a spring resisting inward movement of said system; and a strap bearing on the vehicle spring suspension means at opposite sides of the vehicle, said strap having abutment means thereon normally spaced from the pressure creating member of said pair of shock absorbing devices respectively and adapted to engage the pressure creating member to actuate the same after a predetermined flexing of said vehicle springs.

In witness that I claim the foregoing I have hereunto subscribed my name this 28th day of November, 1925.

HARVEY J. LOUNSBURY.